No. 860,014. PATENTED JULY 16, 1907.
W. H. COLGAN.
OUTLET BOX.
APPLICATION FILED JAN. 26, 1907.
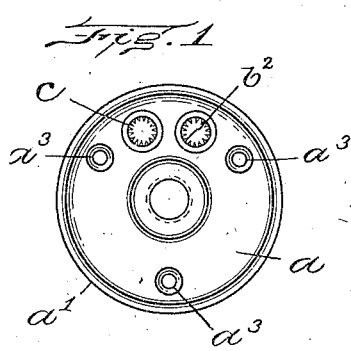
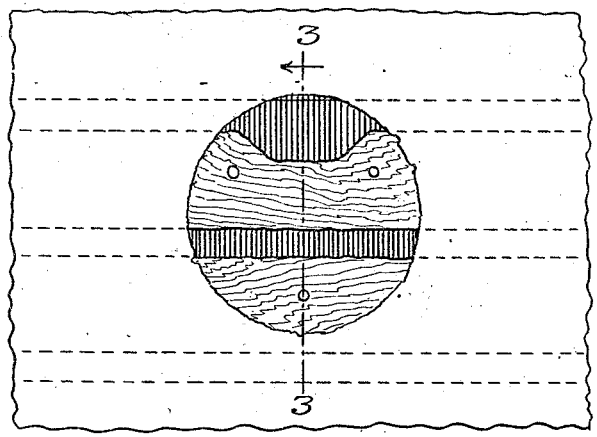
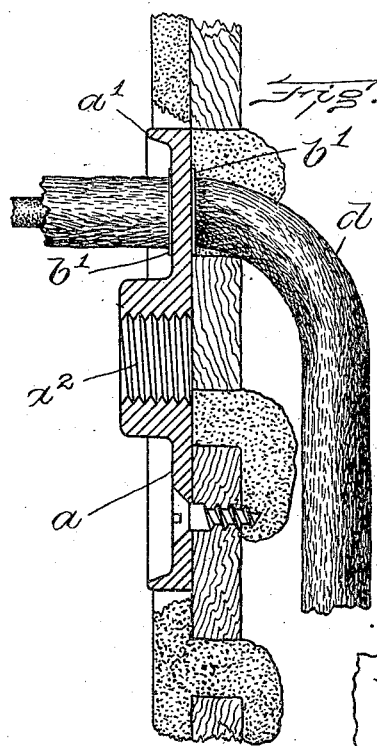
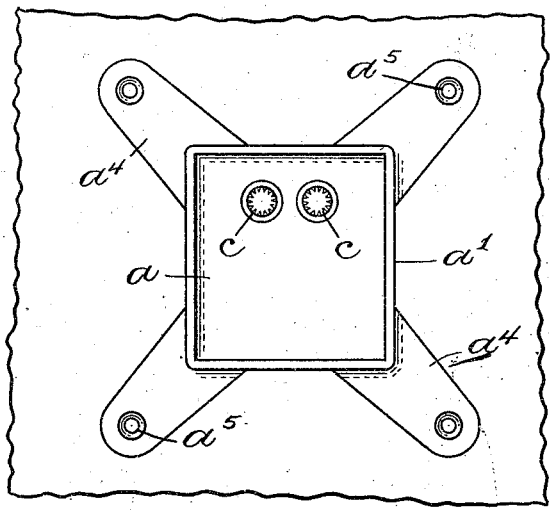
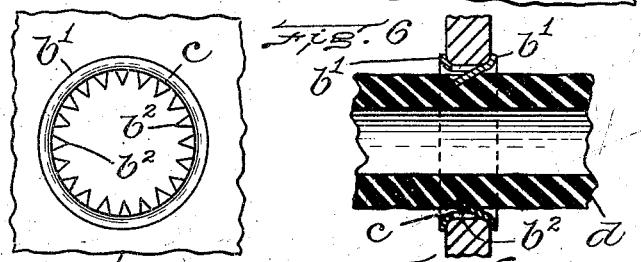
Witnesses:
A. L. Folsom.
J. F. Richardson.
Inventor
William Henry Colgan
by Wright Brown Quinby & May
Attorneys.

UNITED STATES PATENT OFFICE.

WILLIAM H. COLGAN, OF NEWTON, MASSACHUSETTS.

OUTLET-BOX.

No. 860,014.  Specification of Letters Patent.  Patented July 16, 1907.

Application filed January 26, 1907. Serial No. 354,230.

*To all whom it may concern:*

Be it known that I, WILLIAM H. COLGAN, of Newton, in the county of Middlesex and State of Massachusetts, have invented certain new and useful Improvements in Outlet-Boxes, of which the following is a specification.

This invention has relation to outlet or wall boxes or plates, such as employed in electrical installations and particularly for electric fixtures.

It has for its object to provide certain improvements therein by which the conduit may be locked to the wall of the box or plate and held against rearward dislocation, and hence to this end the invention consists, as a new article of manufacture, of a box or plate having an aperture to receive the conduit, and a bushing which is secured against removal in said aperture, and which is formed with a plurality of inwardly or forwardly projecting and converging points or teeth, so that, when a conduit is inserted into said box or plate from the rear or outside, the points engage its exterior surface and prevent its withdrawal.

Referring to the accompanying drawing,—Figure 1 represents a wall box or plate embodying my invention. Fig. 2 shows a portion of a plastered wall with the box removed therefrom. Fig. 3 represents an enlarged vertical section through the box and the adjacent wall. Fig. 4 shows another form of box embodying the same invention. Fig. 5 shows, somewhat enlarged, the toothed bushing and the surrounding wall of the box. Fig. 6 shows how the teeth of the bushing engages the conduit.

On the drawings, $a$ indicates an outlet box or plate, which may be circular as in Figs. 1 and 3, square as in Fig. 4, or which may take any other desired form. As shown, it consists of a base having a rim or flange $a'$, and it may have a central threaded aperture $a^2$ for a fixture, and screw holes $a^3$ to receive screws by which it is secured to the wall, or else it may have ears $a^4$ with screw apertures $a^5$ as illustrated in Fig. 4.

In any event, the base or plate is formed with apertures, preferably two or more (two only being shown) to receive the conduits and their inclosed electrical conductors. These apertures are indicated at $b$, and they are round or circular as shown. Inserted in each aperture is a sleeve or bushing $c$ (made of brass or other suitable metal) of such diameter that it fits tightly therein. Each end of the bushing is flared or upset radially outward to form securing flanges $b'$ $b'$ which bear against the surfaces of the base and secure the bushing against axial movement.

The bushing is formed with a series of spring tongues $b^2$ cut from the cylindrical wall thereof, said tongues being sharp-pointed and extending to an inclination to the axis of said bushing so as to converge toward a common point or center as shown in Fig. 6. The tongues are resilient, so that they will yield when a conduit $d$ is inserted in the aperture from the left in Figs. 3 and 6, so as not to oppose its passage, but on a retrograde movement of the conduit they embed themselves in the conduit as shown in the last-mentioned figure, and lock it securely against rearward displacement.

Having thus explained the nature of the said invention and described a way of constructing and using the same, although without attempting to set forth all of the forms in which it may be made or all of the modes of its use, I declare that what I claim is:—

As a new article of manufacture, a wall box or plate having an aperture, and a bushing inserted in said aperture and having its ends secured to the faces of the wall surrounding said aperture, said bushing having a plurality of resilient tongues projecting inwardly at an inclination to the axis of said bushing for engagement with a conduit, substantially as set forth.

In testimony whereof I have affixed my signature, in presence of two witnesses.

WILLIAM H. COLGAN.

Witnesses:
 M. B. MAY,
 A. L. FOLSOM.